(12) United States Patent
Haynes et al.

(10) Patent No.: US 9,524,493 B2
(45) Date of Patent: Dec. 20, 2016

(54) CHRONOLOGICALLY NAVIGATING AMONG TIME-BASED ENTRIES

(75) Inventors: Thomas Richard Haynes, Apex, NC (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 429 days.

(21) Appl. No.: 12/625,407

(22) Filed: Nov. 24, 2009

(65) Prior Publication Data
US 2011/0126150 A1    May 26, 2011

(51) Int. Cl.
*G06Q 10/10*    (2012.01)
*G06F 17/30*    (2006.01)
*G06F 15/02*    (2006.01)

(52) U.S. Cl.
CPC ......... *G06Q 10/109* (2013.01); *G06F 15/0266* (2013.01); *G06F 17/30551* (2013.01)

(58) Field of Classification Search
CPC .. G06Q 10/109; G06Q 10/1093; G06Q 10/06; G06Q 10/10; G06Q 10/0631; G06F 3/0482; G06F 3/0481; G06F 3/04847; G06F 3/0486; G06F 17/30014; G06F 9/4443; G06F 17/30961; G06F 17/30994; G06F 17/30864; G06F 17/30867; G06F 17/30551; G06F 15/0266; G06F 17/30353

USPC ........ 718/817; 715/817, 853, 854, 963, 836, 715/841, 852; 717/E17.005, E17.017, 999.107; 709/203; 707/E17.005, E17.017, 999.107, 707/999.005
See application file for complete search history.

(56) References Cited

U.S. PATENT DOCUMENTS

| | | |
|---|---|---|
| 5,732,399 A | 3/1998 | Katiyar et al. |
| 6,310,634 B1 | 10/2001 | Bodnar et al. |
| 6,369,840 B1* | 4/2002 | Barnett et al. ................ 715/853 |
| 6,734,883 B1* | 5/2004 | Wynn et al. .................. 715/830 |
| 2005/0041667 A1 | 2/2005 | Miller et al. |
| 2006/0080306 A1* | 4/2006 | Land et al. ....................... 707/3 |
| 2006/0236269 A1 | 10/2006 | Borna |
| 2006/0265660 A1* | 11/2006 | Hullot et al. ................ 715/733 |
| 2008/0034047 A1* | 2/2008 | Rosenberg et al. ........... 709/206 |
| 2008/0235681 A1* | 9/2008 | Barnett ......................... 717/178 |
| 2009/0138504 A1* | 5/2009 | Gile et al. ................. 707/104.1 |
| 2009/0144642 A1* | 6/2009 | Crystal ......................... 715/764 |
| 2009/0248664 A1* | 10/2009 | Childs et al. ..................... 707/5 |
| 2010/0185933 A1* | 7/2010 | Coffman et al. .............. 715/230 |

* cited by examiner

*Primary Examiner* — Alvin Tan
*Assistant Examiner* — Rinna Yi
(74) *Attorney, Agent, or Firm* — Steven L. Nichols; Fabian VanCott

(57) ABSTRACT

Chronologically navigating among time-based entries stored by a physical computing device having a processor configured to execute a time-based application includes displaying, with the computing device, a time-based entry with at least one of a forward control and a backward control; in response to a user selecting the forward control, displaying with the computing device a subsequent time-based entry, the subsequent time-based entry including a shared property with the displayed time-based entry; and in response to the user selecting the backward control, displaying with the computing device a previous time-based entry, the previous time-based entry including a shared property with the displayed time-based entry.

16 Claims, 6 Drawing Sheets

CHRONOLOGICALLY NAVIGATING AMONG TIME-BASED ENTRIES

BACKGROUND

Aspects of the present invention relate in general to the display of digitally stored time-based entries, and more particularly, to the chronological navigation among such time-based entries.

Time-based applications rely on the storage of chronological records (i.e., time-based entries) to organize various events represented by the entries. An example of a computerized time-based application is a calendar application. Calendar applications allow a user to electronically keep track of his or her scheduled events by creating and storing a separate calendar entry (i.e., a time-based entry) for each scheduled event. A calendar entry may contain information related to its associated scheduled event, including the date, time, location, and invited participants of the scheduled event. Often calendar entries for scheduled events also include a description of the event and/or a category associated with the scheduled event.

A user viewing a calendar entry through a computerized calendar application may also desire to view related calendar entries stored by the application. For example, a user may wish to refer to a previous related scheduled event to view information associated therewith when planning a new scheduled event. Likewise, during a scheduled event, a user may wish to refer to the calendar entry for a subsequent related scheduled meeting to add important information thereto. Typically related calendar entries can be viewed only after first performing a manual search of the calendar entries stored by the calendar application.

BRIEF SUMMARY

A method for chronologically navigating among time-based entries stored by a physical computing device having a processor configured to execute a time-based application includes displaying, with the computing device, a time-based entry with at least one of a forward control and a backward control; in response to a user selecting the forward control, displaying with the computing device a subsequent time-based entry, the subsequent time-based entry including a shared property with the displayed time-based entry; and in response to the user selecting the backward control displaying, with the computing device, a previous time-based entry, the previous time-based entry including a shared property with the displayed time-based entry.

A computing system includes a processor and a memory communicatively coupled to the processor, the memory including a plurality of time-based entries stored thereon and a display device configured to display one of the time-based entries with at least one of a forward control and a backward control. The processor is configured to, in response to a user selecting the forward control, navigate to a subsequent one of the time-based entries, the subsequent one of the time-based entries including a shared property with the displayed time-based entry; and in response to the user selecting the backward control, navigate to a previous one of the time-based entries, the previous one of the time-based entries including a shared property with the displayed time-based entry.

A computer program product for calendar navigation includes a computer readable storage medium including computer readable code embodied therewith. The computer readable program code includes computer readable program code configured to display a time-based entry with at least one of a forward control and a backward control; computer readable program code configured to, in response to a user selecting the forward control, display a subsequent time-based entry, the subsequent time-based entry including a shared property with the displayed time-based entry; and computer readable program code configured to, in response to the user selecting the backward control, display a previous time-based entry, the previous time-based entry including a shared property with the displayed time-based entry.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
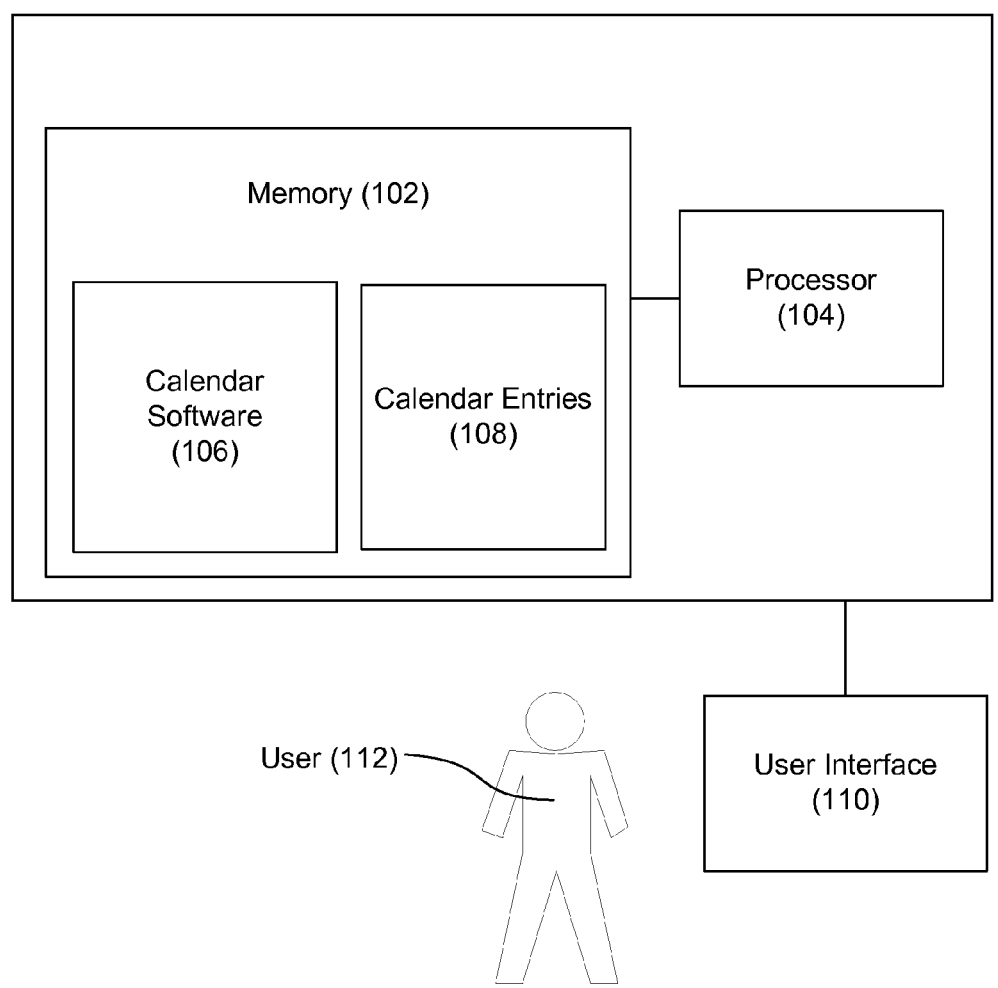
FIG. 1 is a diagram showing an illustrative computerized calendar system providing a user a means to navigate to a related backward or subsequent event, according to one embodiment of principles described herein.

The present specification relates to the efficient navigation through time-based application entries such as calendar entries stored by a computerized calendar application. According to one illustrative embodiment, a user interface for a computerized calendar application may provide a forward control and/or a backward control. The forward control may cause the calendar application to skip to the next calendar entry which is related to the calendar entry being currently displayed. Likewise, the backward control may cause the calendar application to skip to a backward calendar entry related to calendar entry currently being displayed.

In certain embodiments, a user may place tags within some of the calendar entries. The forward and backward controls may be configured to jump to different calendar entries having a similar tag. A computerized calendar application embodying principles described herein may allow a user a quick and efficient means to navigate through several calendar entries.

For purposes of illustration, of the principles of the present specification will be given generally as they relate to the navigation among time-based calendar entries in a calendar application. However, it will be readily understood that the principles described herein may be applied to any time-based application that utilizes time-based entries. For example, the principles described herein may also be applied to computer applications such as email applications, workflow applications, and docketing applications.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "control" in relation to a user interface is to be broadly interpreted as a means for a user to indicate that a specific action is to be performed by a physical computing system.

Throughout this specification and in the appended claims, the term computerized calendar system is to be broadly interpreted as a system implemented by at least one physical processor which stores and organizes a plurality of calendar events accessible to a user through a user interface.

Referring now to the figures, FIG. 1 is a diagram of an illustrative computerized calendar system (100) allowing a user to navigate to a related previous or subsequent calendar entry stored by the system (100). According to one illustrative embodiment, a computerized calendar system (100) may include a memory (102) having calendar software (106) to manage calendar entries (108) stored thereon. The computerized calendar system (100) may further include a processor (104) and a user interface (110).

A computerized calendar system (100) may be embodied as a variety of physical computing devices including, but not limited to, a laptop computer, a desktop computer, and a Personal Digital Assistant (PDA). A computerized calendar system may include standard components such as a processor (104) to execute instructions and memory (102) for storing data.

Various types of calendar software (106) may be used to assist users in the task of managing their schedules. Calendar software (106) generally operates by storing calendar entries associated with scheduled events for a particular user (112). These entries may be created, edited, and viewed by a user (112). Each calendar entry (108) may be associated with a date and time. Some types of calendar software may allow the user (112) to associate various electronic documents and other information with a particular calendar entry (108).

A user interface (110) may provide a means for the user (112) to interact with a computerized calendar system (100). A user interface may include an output component such as a display device and input components such as a mouse or keyboard. Information associated with calendar entries (108) may be displayed to the user (112) through a display device. Instructions from the user to the computerized calendar system (100) may be received through a keyboard or mouse.

Figure 2:
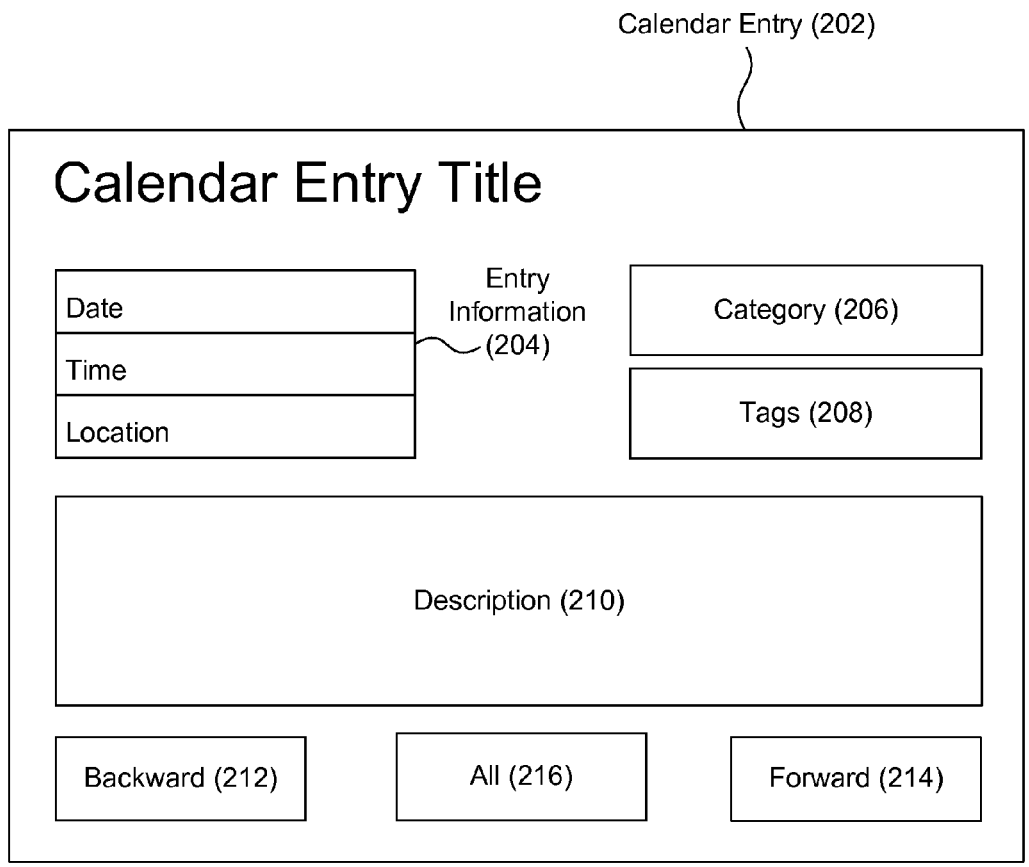
FIG. 2 is a diagram of a displayed illustrative calendar entry (202) in a computerized calendar system, according to one embodiment of principles described herein.

FIG. 2 is a diagram of a displayed illustrative calendar entry (202) in a computerized calendar system. According to one illustrative embodiment, a user interface may display the calendar entry (202) to a user using, for example, a monitor or other display device. The calendar entry (202) may include event information (204), an event category (206), event tags (208), an event description (210), a "forward" control (212), a "backward" control (214), and an "all" control (216).

A user interface (200) may be configured to display an overview of several calendar entries (202) over a typical calendar display. A calendar entry may represent an event such as a meeting or appointment. A user may select a particular calendar entry (202) for a more detailed view of that calendar entry (202). FIG. 2 illustrates an example of a detailed view of a calendar entry.

Entry information (204) associated with a calendar entry (202) may include the date, time, and location (if applicable) related to an event represented by the calendar entry. A description (210) of the event represented by a calendar entry may also be displayed. The description (210) may include notes from an event, electronic documents related to the meeting or event and other sources of information that may be applicable to an event represented by the calendar entry (202).

Calendar entries (202) may be placed within different categories (206). A category (206) may indicate the type of event represented by the calendar entry (202). For example, if a user has a recurring staff meeting, the user may create a staff meeting category (206) in his or her computerized calendar system. Each staff meeting may then be assigned to the created staff meeting category (206).

Through the user interface, a user may assign tags (208) to a calendar entry (202). A tag (208) may be assigned to indicate a particular property associated with the calendar entry (202). For example, a tag (208) may indicate a particular topic that was discussed or will be discussed in a meeting. Furthermore, a tag (208) may indicate that a specific individual was in charge or will be in charge of a particular meeting. A user may place several tags (208) with a particular calendar entry. Some tags (208) may be placed with several different categories (206) of calendar entries (202).

The user interface (200) may provide a backward control (212) which may cause the computerized calendar system to navigate to a previous entry having a shared property of the displayed calendar entry. The shared property may be a title, category, or tag associated with the displayed calendar entry.

Likewise, the user interface (200) may provide a forward control (214) which may cause the computerized calendar system to navigate to a subsequent calendar entry having a shared property of the displayed calendar entry. The shared property may be a title, category, or tag associated with the displayed calendar entry.

In certain embodiments, the backward control (212) and the forward control (214) may be defaulted to navigate to a previous or subsequent calendar entry based on the category (206) of the displayed calendar entry (202). However, a user may be provided with the tools to set the backward control (212) and/or the forward control (214) to navigate to a related title or tag.

According to certain embodiments, an "all" control (216) may be provided to allow a user to view a list of all calendar entries having a particular shared property. This shared property may include a title, a category, or a tag.

Figure 3:
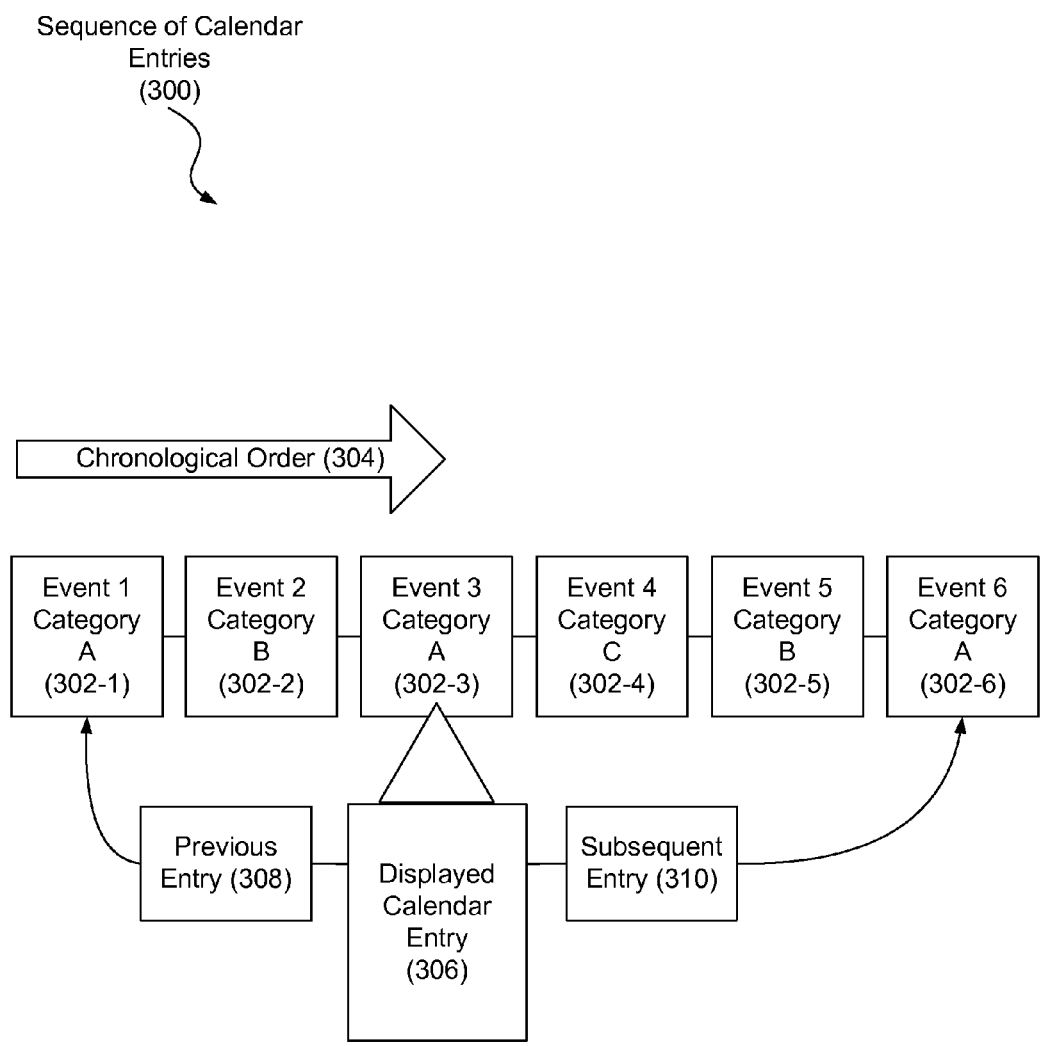
FIG. 3 is a diagram showing an illustrative sequence of calendar entries in a computerized calendar system, according to one embodiment of principles described herein.

FIG. 3 is a diagram showing an illustrative sequence of calendar entries (300) in a computerized calendar system, some of which are related by category. According to one illustrative embodiment, a number of calendar entries (302-1 to 302-6) may be represented in chronological order (304). The currently displayed calendar entry (306) may be linked to a previous and a subsequent calendar entry representing an event of the same category.

As mentioned above, a calendar entry may be assigned to a particular category. The forward and backward controls may be configured to cause the computerized calendar system to navigate to a previous or subsequent related calendar entry. The related calendar entry may have a shared category.

FIG. 3 shows several calendar entries (302-1 to 302-6) in chronological order (304). Calendar entry 3 (302-3) is indicated as the displayed calendar entry (306) and is placed within category A. When viewing calendar entry 3 (302-3) and selecting the backward control, the computerized calendar system may navigate to the previous calendar entry (308) having been assigned to category A. In the case of FIG. 3, calendar entry 1 (302-1) is the previous calendar entry having been assigned to category A. Likewise, when engaging the forward control, the computerized calendar system may navigate to the subsequent calendar entry (310) having been assigned to category A. In the case of FIG. 3, calendar entry 6 (302-6) is the previous calendar entry having been assigned to category A.

Figure 4:
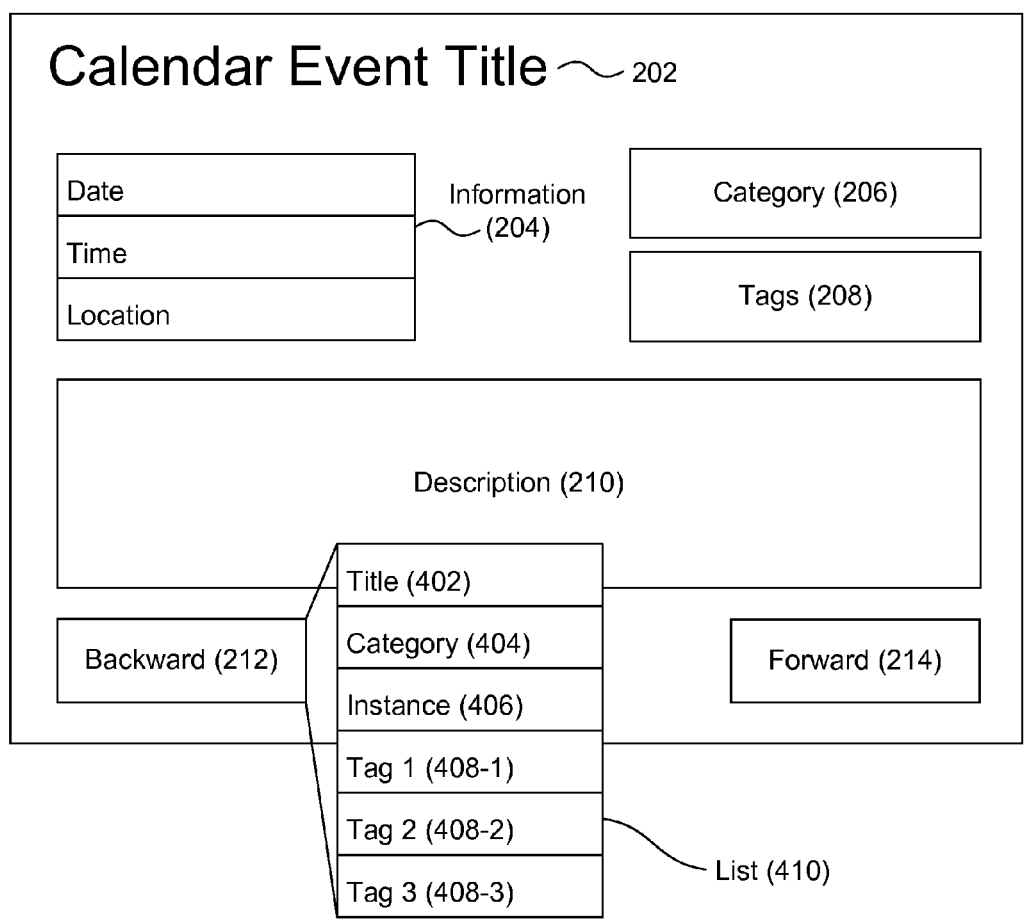
FIG. 4 is a diagram an illustrative displayed calendar entry in a computerized calendar system, according to one embodiment of principles described herein.

FIG. 4 is a diagram an illustrative displayed calendar entry (400) that allows a user to selectively navigate to a related previous or subsequent calendar entry. According to one illustrative embodiment, when a user engages a forward or backward control, a list (410) may appear prompting the user to select which property of the displayed calendar entry to use when navigating to a previous or subsequent calendar entry.

A list (410) may offer a user several properties from which a user may select a desired property to use when navigating to a previous or subsequent calendar entry. These properties may include, but are not limited to, title (402), category (404), instance (406), and tags (408-1, 408-2, 408-3).

If a user selects to navigate based on title (402), then the computerized calendar system may navigate to a previous or subsequent calendar entry having a similar or exact title. Likewise, if a user selects to navigate based on category (404), then the computerized calendar system may navigate to a previous or subsequent calendar entry having a shared category.

In some cases, a calendar entry may have several instances throughout the timeline represented by the computerized calendar system. For example, a user may have a recurring appointment every month in which the only difference between instances of the appointment is the date and time. A user may select to navigate to a previous or subsequent calendar entry based on the instance (406) of the displayed calendar entry.

As mentioned above, a user may assign a number of tags (408) to a particular calendar entry. A user may select to navigate to a previous or subsequent calendar entry based on one of the tags (408) assigned to the displayed calendar entry.

Figure 5:
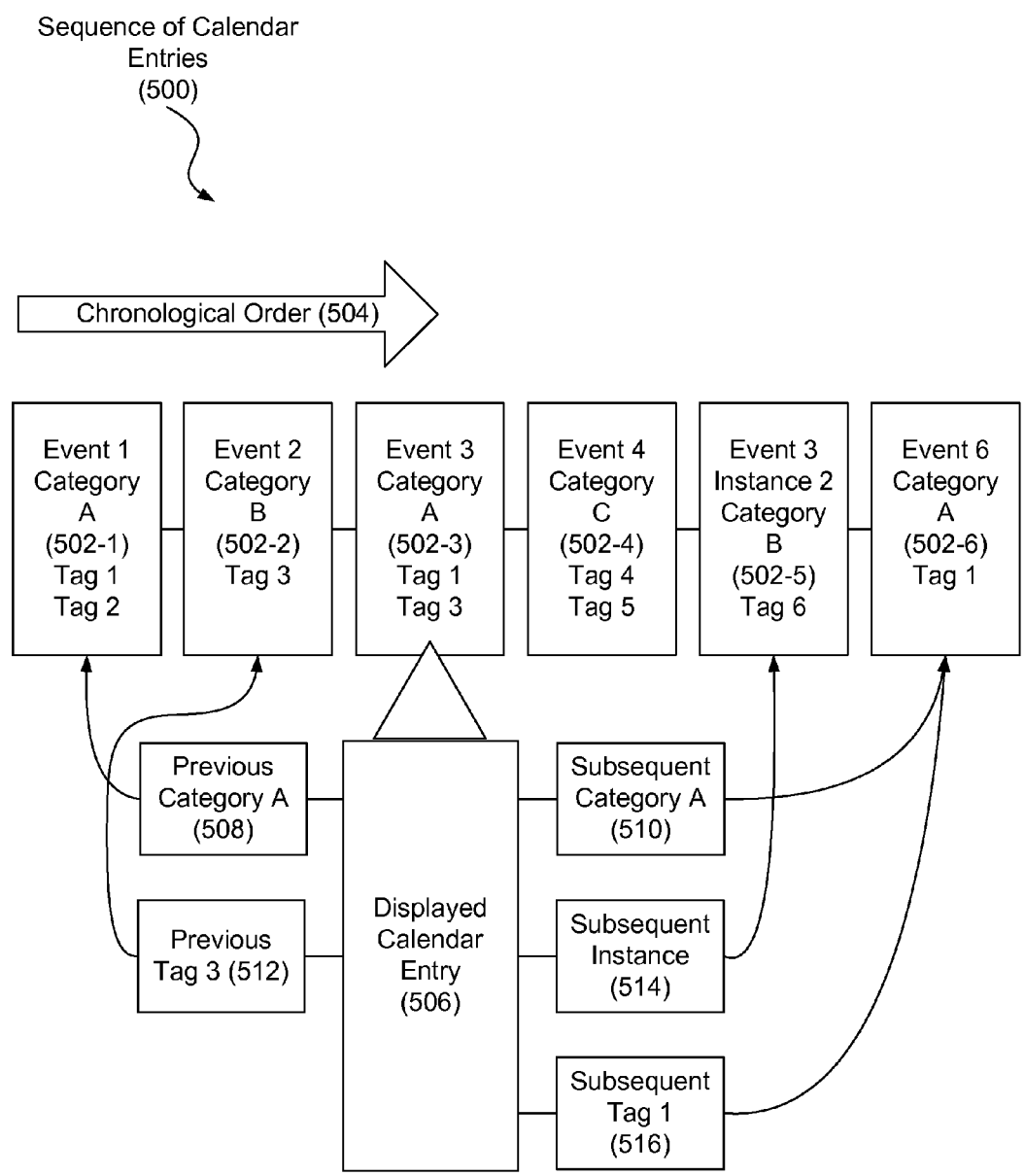
FIG. 5 is a diagram showing an illustrative sequence of calendar events, according to one embodiment of principles described herein.

FIG. 5 is a diagram showing an illustrative sequence of calendar events (500), some of which are associated with a related event category, tag, or instance. According to certain embodiments, a user may navigate to a previous or subsequent calendar entry based on a shared category, instance, or tag.

FIG. 5 is a sequence of calendar entries (500) showing several calendar entries (502) in chronological order (504). According to one illustrative embodiment, a number of calendar entries (502-1 to 502-6) may be represented in chronological order (504). Calendar entry 3 (502-3) is indicated as the displayed calendar entry (506) and is placed within category A. If a user selects the backward control and selects the category option, the computerized calendar system may navigate to the previous calendar entry (508) having been placed within category A. In the case of FIG. 5, calendar entry 1 (502-1) is the previous calendar entry having been assigned to category A. Likewise, when a user selects the backward control and selects the tag 3 option, the computerized calendar system may navigate to the previous calendar entry (512) having been assigned Tag 3. In the case of FIG. 5, calendar entry 2 (502-2) is the previous calendar entry having been assigned tag 3.

If a user selects the forward control and selects the category option, the computerized calendar system may navigate to the subsequent calendar entry (510) having been placed within category A. In the case of FIG. 5, calendar entry 6 (502-6) is the previous calendar entry having been assigned to category A. Likewise, when a user selects the forward control and selects the instance option, the computerized calendar system may navigate to the subsequent calendar entry (514) being an instance of the currently displayed calendar entry (506). In the case of FIG. 5, calendar entry 5 (502-5) is a subsequent instance of the displayed calendar entry (506). Furthermore, when a user selects the forward control and selects the tag 1 option, the computerized calendar system may navigate to the subsequent calendar entry (516) also having been assigned tag 1. In the case of FIG. 5, calendar entry 6 (502-6) is a subsequent calendar entry having been assigned tag 1.

Figure 6:
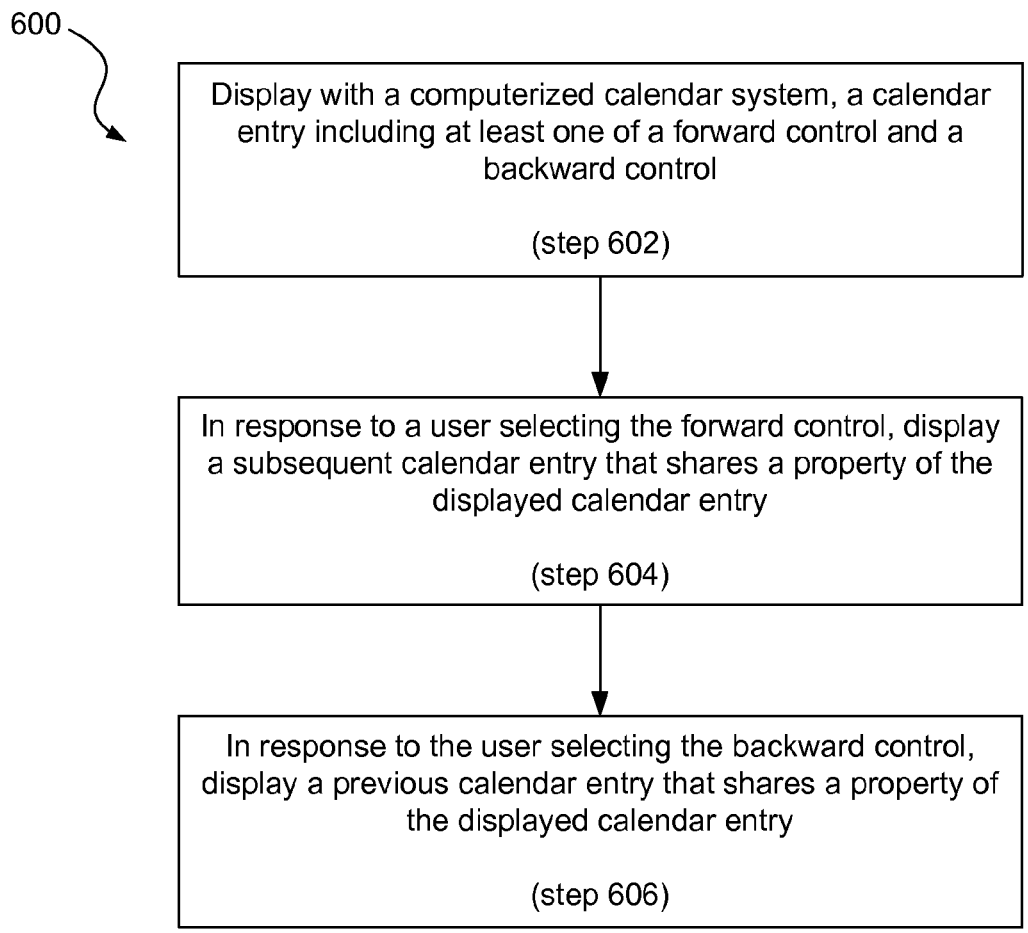
FIG. 6 is a flowchart showing an illustrative method for calendar navigation, according to one embodiment of principles described herein.

FIG. 6 is a flowchart showing an illustrative method (600) for calendar navigation. According to certain embodiments, the method (600) may include displaying (step 602) with a computerized calendar system a calendar entry with at least one of a forward control and a backward control. In response to a user selecting the forward control, the computerized calendar system displays (step 604) a subsequent calendar entry, the subsequent calendar entry including a shared property of the displayed calendar entry. In response to the user selecting the backward control, the computerized calendar system displays (step 606) a previous calendar entry that shares a property of the displayed calendar entry.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for chronologically navigating among time-based entries stored by a physical computing device comprising a processor to execute a time-based application, the method comprising:

displaying, with said computing device, a time-based entry with at least one of a forward control and a backward control;

in response to a user selecting said forward control, displaying with said computing device a subsequent time-based entry, said subsequent time-based entry comprising a shared property with said displayed time-based entry;

in response to said user selecting said backward control, displaying with said computing device a previous time-based entry, said previous time-based entry comprising a shared property with said displayed time-based entry; and with said computing device and in response to said user selecting at least one of said forward control and said backward control, prompting said user to select a property associated with said displayed time-based entry, in which said shared property is said property selected by said user;

in which the shared property is assigned by a user.

2. The method of claim 1, in which said shared property comprises a category of said displayed time-based entry.

3. The method of claim 1, in which said shared property comprises a tag associated with said displayed time-based entry.

4. The method of claim 3, in which said tag is selected by said user.

5. The method of claim 1, in which said shared property comprises at least a portion of a title of said displayed time-based entry.

6. The method of claim 1, further comprising displaying, with said computing device, a comprehensive control with said displayed time-based entry, said comprehensive control causing said computing device to display a list of all time-based entries comprising said shared property if said comprehensive control is selected by said user.

7. A computing system comprising:
a processor; and
a memory communicatively coupled to said processor, said memory comprising a plurality of time-based entries stored thereon; and
a display device to display one of said time-based entries with at least one of a forward control and a backward control;
in which said processor:
in response to a user selecting said forward control, navigates to a subsequent one of said time-based entries, said subsequent one of said time-based entries comprising a shared property with said displayed time-based entry;
in response to said user selecting said backward control, navigates to a previous one of said time-based entries, said previous one of said time-based entries comprising a shared property with said displayed time-based entry;
prompts said user to select a property associated with said displayed time-based entry, in which said shared property is said property selected by said user and in which said prompting of said user to select a property associated with said displayed time-based entry occurs in response to said user selecting at least one of said forward control and said backward control;
in which said shared property is a tag, and
in which said tag is assigned by a user.

8. The computing system of claim 7, in which said shared property comprises a category of said displayed time-based entry.

9. The computing system of claim 7, in which said shared property comprises a tag associated with said displayed time-based entry.

10. The computing system of claim 7, in which said tag is selected by said user.

11. The computing system of claim 7, in which said shared property comprises at least a portion of a title of said displayed time-based entry.

12. The computing system of claim 7, in which said processor further displays a comprehensive control on said display device with said displayed time-based entry, said comprehensive control causing said processor to display on said display device a list of all time-based entries with said shared property if said comprehensive control is selected by said user.

13. A computer program product for calendar navigation, said computer program product comprising:
a non-transitory computer readable storage medium comprising computer readable code embodied therewith, said computer readable program code comprising:
computer readable program code to, when executed by a processor, display a time-based entry with at least one of a forward control and a backward control;
computer readable program code to, when executed by a processor, in response to a user selecting said forward control, display a subsequent time-based entry, said subsequent time-based entry comprising a shared property with said displayed time-based entry; and
computer readable program code to, when executed by a processor, in response to said user selecting said backward control, display a previous time-based entry, said previous time-based entry comprising a shared property with said displayed time-based entry,
in which the shared property comprises a tag associated with said displayed time-based entry,
in which said tag is selected by said user;
in which said computer readable program code further comprises computer readable program code to, when executed by a processor, prompt said user to select a property associated with said displayed time-based entry, in which said shared property is said property selected by said user; and
in which said prompting of said user to select a property associated with said displayed time-based entry occurs in response to said user selecting at least one of said backward control and said forward control.

14. The computer program product of claim 13, in which said shared property further comprises a title of said displayed time-based entry, or a category of said displayed time-based entry.

15. The computer program product of claim 13, further comprising computer readable program code to, when executed by a processor, assign a number of shared properties to said displayed time-based entry.

16. The computer program product of claim 15, in which the computer readable program code to, when executed by a processor, assign a number of shared properties to said displayed time-based entry comprises computer readable program code to, when executed by a processor, assign a number of the tags to the displayed time-based entry.

* * * * *